INVENTOR
WILLIAM C. TAYLOR
BY Dominik & Stein
ATTORNEY

INVENTOR
WILLIAM C. TAYLOR
BY Dominick Stein
ATTORNEY

Nov. 12, 1968 W. C. TAYLOR 3,411,005

COMPACT INFRARED DETECTOR SYSTEMS WITH REGULATED POWER SUPPLY

Filed Jan. 24, 1966 3 Sheets-Sheet 3

INVENTOR
WILLIAM C TAYLOR

BY Dominik & Stein
ATTORNEY

1

3,411,005

COMPACT INFRARED DETECTOR SYSTEMS WITH REGULATED POWER SUPPLY

William C. Taylor, Waterford, Pa., assignor to Automation Devices Inc., Erie, Pa., a corporation of Pennsylvania Filed Jan. 24, 1966, Ser. No. 522,572

2 Claims. (Cl. 250—83.3)

This invention relates to detectors and more particularly to infrared detector systems.

Infrared systems may be generally classified as passive or active systems. The latter class includes pyrometers, astronomical telescopes, "hot body" tracking systems, while the former class includes microscopes, communication systems, continuous process analyzers and, in general, any optical system which depends upon the effects of an infrared emitter being detected and analyzed by an infrared receiver. The present invention is more particularly related to this latter class of infrared system, that is, a passive system.

Passive systems can be further generally classified into variable intensity infrared source systems and constant intensity infrared source systems, and the present invention is of the latter type. Passive systems having a constant intensity source are generally known and in the past, have been used for a whole host of different applications. The available systems, however, are extremely complex and, therefore, are accordingly costly. Furthermore, the complexity of these systems subject them to constant adjustment and realignment, and this task generally requires the services of a skilled technician. In addition, many of the available systems are unsatisfactory, for various other reasons.

In view of the fact that passive systems having a constant intensity infrared source can be used in most applications in which photoelectric systems can be used, it would be particularly advantageous to have a relatively simple and inexpensive unit which can be used in place of a photoelectric system. Furthermore, in addition to providing better results in many of these applications, infrared systems are applicable for use in a number of instances where photoelectric systems are inoperative. For example, in detecting the presence of a transparent material, photoelectric systems are generally inoperative since light can pass through the material and impinge on the detector element. A false indication is therefore provided.

Accordingly, it is an object of the present invention to provide an improved infrared detector system.

Another object is to provide an improved infrared detector system which, in comparison to existing systems, is relatively simple in construction and is, accordingly, less expensive. In this respect, it is contemplated that the system be easily and inexpensively maintained and, in most cases, easily repaired and adjusted by the operator. The services of a skilled technician therefore are not generally required. Another related object is to provide a system, as described, which may be initially installed without the services of a skilled technician.

Still another object is to provide an infrared detector system having good sensitivity, and which has a detector element which has good stability.

A still further object is to provide an infrared detector system which is a self-contained, compact unit which only needs to be connected to a source of power. In this respect, it is further contemplated that the system have detachable plug-in emitter and detector elements which are coupled to the control portion thereof by means of lengthened conductors, so that the emitter and detector elements can be easily and quickly installed, in close proximity to an object or object to be detected.

2

Other objects of the invention will in part be obvious and will in part appear hereinafter.

The above objectives are accomplished with an infrared detector system which, generally, comprises a source of infrared energy, a detector for detecting the infrared energy emanated by said source and a control unit for supplying a source of power to said source and said detector and for transmitting a control signal in accordance with the received or not received infrared energy. The source of infrared energy is preferably a tungsten filament lamp and the detector is preferably a lead sulfide cell, although other types of elements may be used, with generally the same satisfactory results. The tungsten filament lamp and the lead sulfide cell are each encapsuled in small probes which may be detachably affixed to the control unit and which may be positionably installed, in close proximity to an object or objects to be detected, while the control unit is placed remotely therefrom.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

Figure 1:
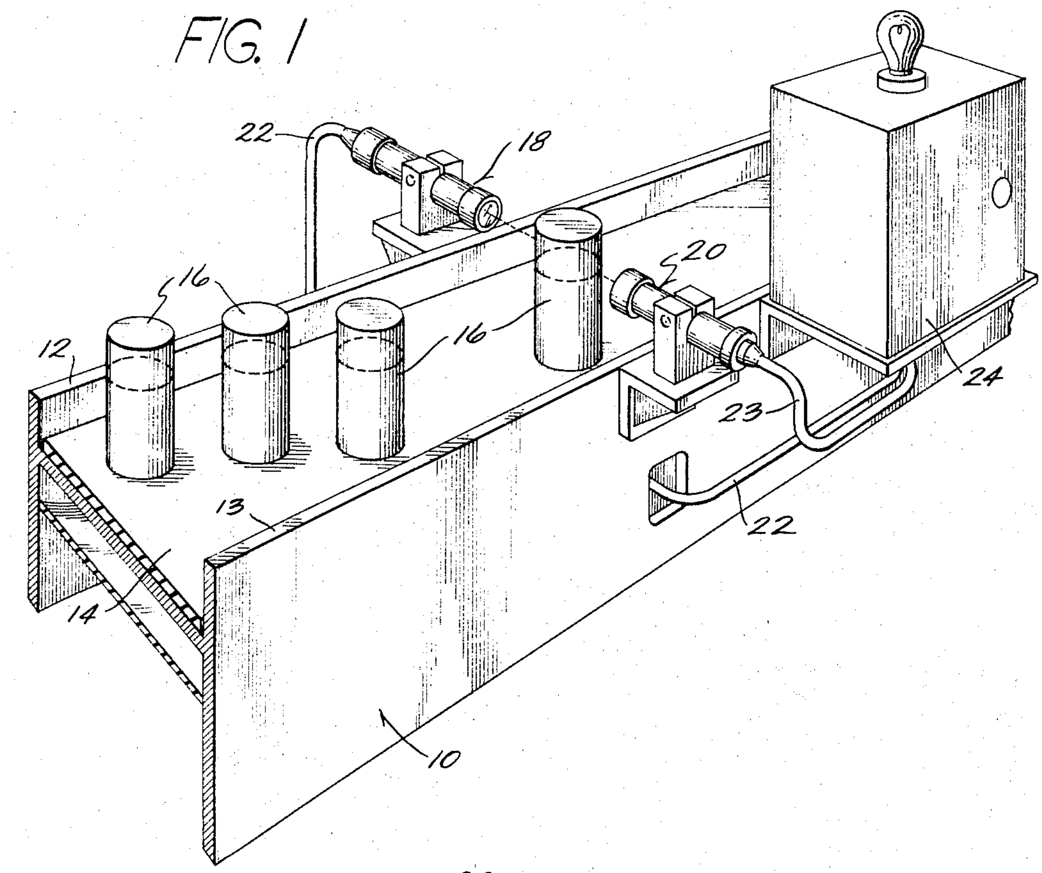
FIG. 1 is a perspective view illustrating the application of the infrared detector system to a conveyor line for detecting the presence of liquid within an object or objects being transported upon the conveyor system.

Referring now to the drawings, in FIG. 1 there is illustrated a conveyor system 10 having a pair of side walls 12 and 13 between which a conveyor belt 14 is rotatably supported. Objects which may be transparent bottles 16 are continuously deposited, either manually or automatically, upon the conveyor belt 14, and means (not shown) are provided to advance the belt 14 to transport the bottles from its one end to its other. As the bottles pass down the length of the conveyor belt 14, they pass between an emitter probe 18 and a detector probe 20 which are coupled by means of conductors 22 and 23, respectively, to a control unit 24. The emitter and detector probes 18 and 20, the conductors 22 and 23 and the control unit 24 are all part of the infrared detector system 30 of the present invention, shown schematically in FIG. 2 and described in full below.

As indicated above, the infrared detector system 30 is applicable for any application where photoelectric detection systems are used, and are, in addition, applicable in many instances where they are not. The system illustrated in FIG. 1 is typical of the latter. Normally, in a photoelectric detection system, a source of light is impinged on a photoelectric cell which detects the light impinged on it and generates a signal indicative of the fact that the light source is being received. An object passing between the source of light and the photoelectric cell cuts off the light and the photoelectric cell generates a representative signal. This operation is well known and further elaboration is therefore deemed unnecessary. It is apparent that a system of this type is inoperable if the light rays can pass through the object which is to be detected and impinge on the photoelectric cell, for the photoelectric cell is unable to distinguish the absence of the light rays. Systems have been constructed which operate on a threshold value, that is, light rays of a pre-established intensity must impinge on the photoelectric cell, however, these systems are generally unsatisfactory because of their complexity and instability.

In the case of a passive infrared detection system having a constant intensity infrared source, the detector generates a signal which is in direct relation to the amount of infrared energy or radiation allowed to impinge upon the detector. Also, any object is emissive of or to a level of infrared energy impinged upon it, depending upon its composition. Accordingly, the amount of infrared energy permitted to impinge on a detector is a direct reading of the object or obstacle encountered by that energy when traveling from the infrared emitter to the detector. In the system illustrated in FIG. 1, if the transparent bottle is fabricated of, for example, a transparent plastic, the plastic will emit a level of infrared energy which is determined by or dependent upon its particular composition. The detector 20 is responsive to infrared energy within a predetermined range, and if the level of infrared energy falls within this range, the object, in this case, a plastic bottle, will be detected.

Figure 2:
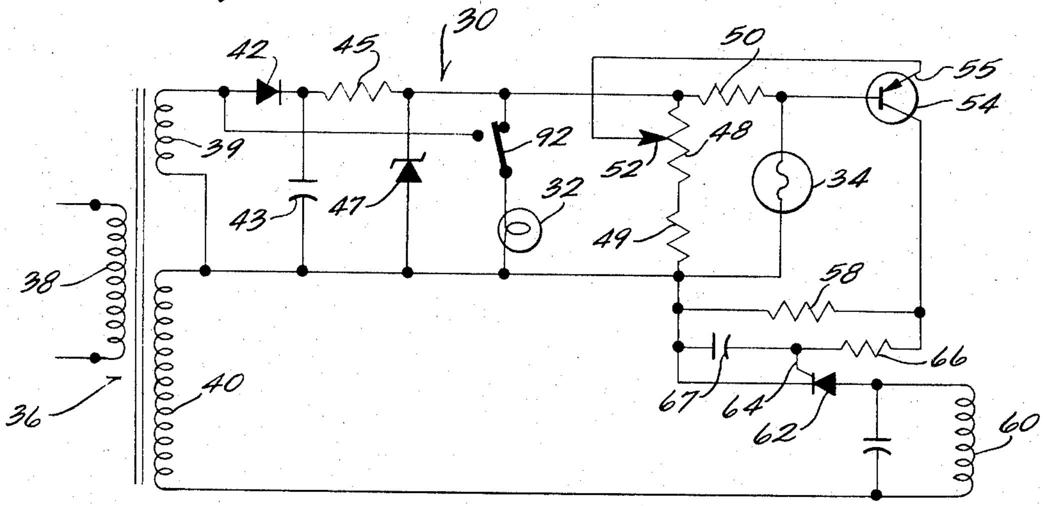
FIG. 2 is a schematic diagram of the electrical circuitry for the infrared detector system.

In FIG. 2, the infrared detector system 30 is shown schematically and it may be seen that it includes a tungsten filament lamp 32 which functions as the source of infrared energy for the system, and a lead sulfide cell 34 which functions as the detector. A source of power (not shown) which may be the 110 volt source generally found in the home or office is coupled to a primary winding 38 of a transformer 36 having a pair of secondary windings 39 and 40. The output voltage across the winding 39 is rectified and filtered by means of a diode 42 and a capacitor 43 to provide a DC voltage supply for the lamp 32 and the cell 34. The DC voltage is coupled through a load resistor 45 and a Zener diode 47 is provided as a voltage stabilizer, to maintain the DC voltage to the lamp 32 and the cell 34 at 4.7 volts.

The lead sulfide cell 34 is included as one leg of a balanced resistance bridge, including the cell 34 and three resistors 48–50, connected across the DC voltage supply. The resistor 48 is advantageously a potentiometer and a transistor 54 has its emitter electrode 55 connected to the output tap 52. The base electrode 56 of transistor 54 is connected to the junction between the resistor 50 and the cell 34. With this arrangement, the potential difference between the output tap 52 and the junction between resistor 50 and the cell 34 can be adjusted, by varying the position of the output tap 52, to bias the transistor 54. Transistor 54 may be of any conventional type. The collector electrode 57 of transistor 54 is connected to one terminal of a load resistor 58 and the other terminal of resistor 58 is connected to the junction between the resistor 49 and the cell 34.

In the illustrated example, a relay 60 is connected across the winding 40 of transformer 36, and a silicon control rectifier 62 is serially connected with it to normally prevent current flow through the circuit to operate the relay 60. A control electrode 64 of the silicon control rectifier 62 is connected to the junction between a resistor 66 and a capacitor 67 serially connected in parallel with the load resistor 58. When transistor 54 is rendered conductive, current flows through load resistor 58 and the voltage drop across it is coupled to the control electrode 64 to "turn-on" the silicon control rectifier, in the manner well known in the art. When the silicon control rectifier is "turned-on," current flows through the circuit including it, the secondary winding 40 and the relay 60, to operate relay 60. The operation of the infrared detector system 30, in this respect, is described more fully below.

Figure 3:
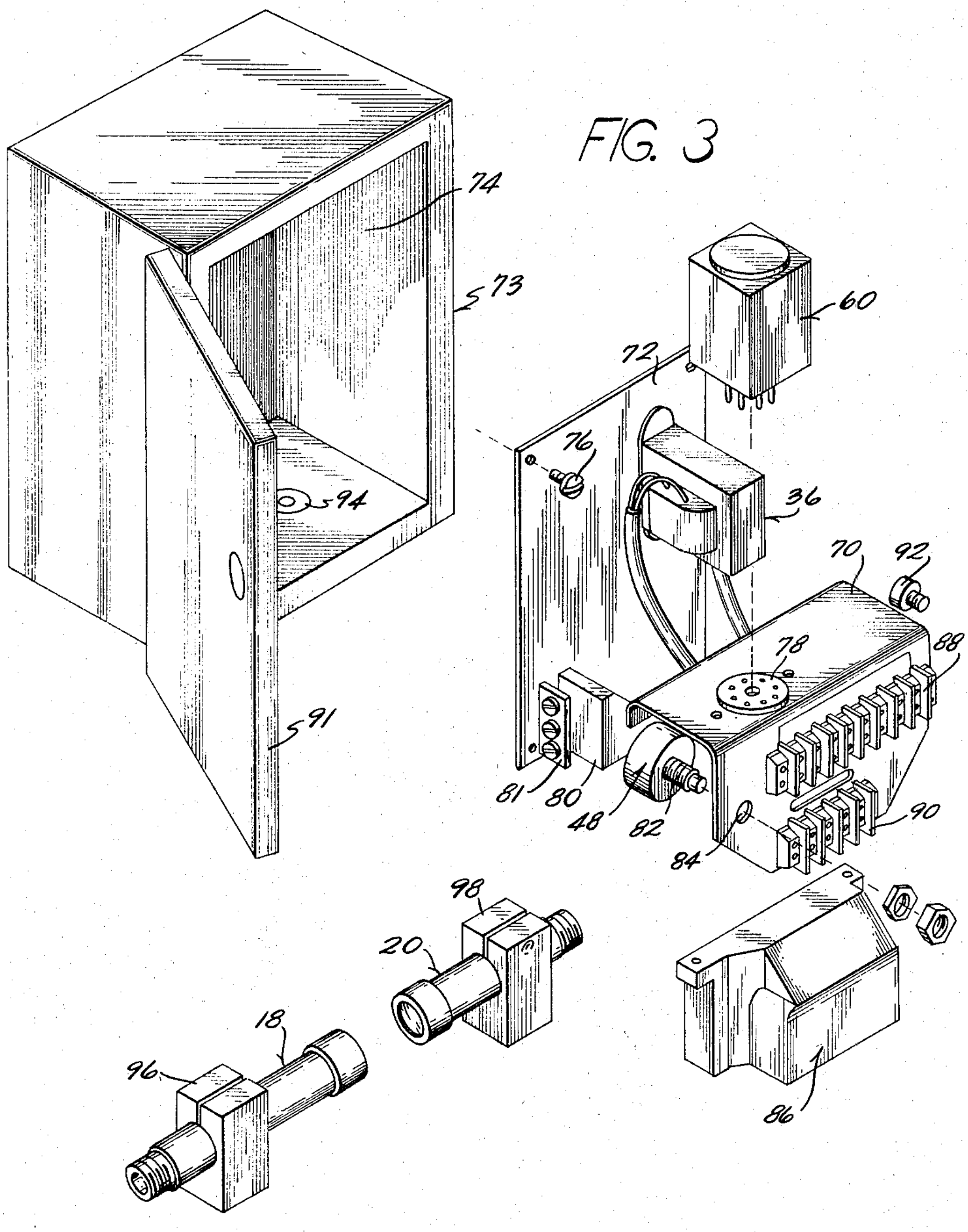
FIG. 3 is an exploded perspective view of the infrared detector system, illustrating its compact construction.

In FIG. 3, which is an exploded perspective view of the infrared detector system 30, its compact construction and the simple manner in which it can be assembled can be seen. A chassis 70 is affixed to a base plate 72 and the components of the system are affixed to one or the other of the chassis 70 and the base plate 72. The base plate 72 is, in turn, removably affixed with fastening means, such as threaded screws 76, to the back wall 74 of an enclosure cabinet 73, whereby the components can be easily removed for repair or modification. The relay 60 is of the plug-in type and a socket 78 is affixed to the top of the chassis 70 for mounting the relay 60. The transformer 36 is mounted to the base plate 72, beneath the chassis 70. The diode 42 and the Zener diode 47 are enclosed within a sealed box 80 secured to the base plate 72 and a terminal strip 81 is affixed to the outside wall of the box 80 for making electrical contact with their electrodes. The resistor or potentiometer 48 which functions as a sensitivity control has a threaded portion 82 which is extended through an aperture 84 in the chassis 70 and received within a pair of nuts 86 for securing the potentiometer 48 to the chassis. As can be seen, both the box 80 and the potentiometer 48 are also secured beneath the chassis 70. The remaining components, with the exception of the tungsten filament lamp 32 and the lead sulfide cell 34, are appropriately wired and potted within a component box 86 which is adapted to be affixed to and beneath the chassis 70. A pair of terminal strips 88 and 90 are affixed to the chassis 70 and the leads of the components are coupled to appropriate ones of the terminals on the strips 88 and 90, so that access may be easily gained to the components for testing and for assembly. A switch which may be a push-button switch 92 is also affixed to the chassis 70 and, as can be seen in FIG. 2, is normally operative to connect the lamp 32 across the 4.7 volts supply. Upon operating the switch 92, the lamp 32 is connected directly across the secondary winding 39. In this position, the lamp 32 will become incandescent and its incandescence can be used to align the emitter detector probe 20, in the manner described below.

In assembling the detector system 30, the components are first affixed to the chassis 70 and the base plate 72, and the latter is fixedly secured to the back wall 74 of the cabinet 73. The cabinet 73 is of a sealed, dust-proof construction and has a door 91 for access. The components contained within the cabinet 73 constitute the control unit 24, previously referred to above. A pair of sockets 94 (only one of which can be seen in FIG. 1) for the connecting leads 22 and 23 which couple the emitter probe 18 and the detector probe 20 to the control unit 24 are affixed to a bottom wall 96 of the cabinet 73 and are appropriately connected to the terminal strip 90. The connecting leads 22 and 23 can be detachably plugged in to the sockets 94 to establish electrical connections between the emitter probe 18 and the detector probe 20 and the control unit 24.

The emitter probe 18 and the detector probe 20 are removably clamped within mounting brackets 96 and 98, respectively, which may be affixed to the conveyor 10 or some structure, in close proximity to the object or objects to be detected. The filter end of the emitter probe 18 and the detector probe 20 each have a threaded portion 97 and 99, respectively (FIGS. 4 and 7), for a pair of lock nuts (not shown) so that the probes also can be passed through an aperture in a support structure and secured therein by means of lock nuts. The connecting leads 22 and 23 (not shown in FIG. 3) are coupled to the emitter and detector probes 18 and 20, and are plugged into the sockets 94, to establish electrical connections between them and the control unit 24.

Figure 4:
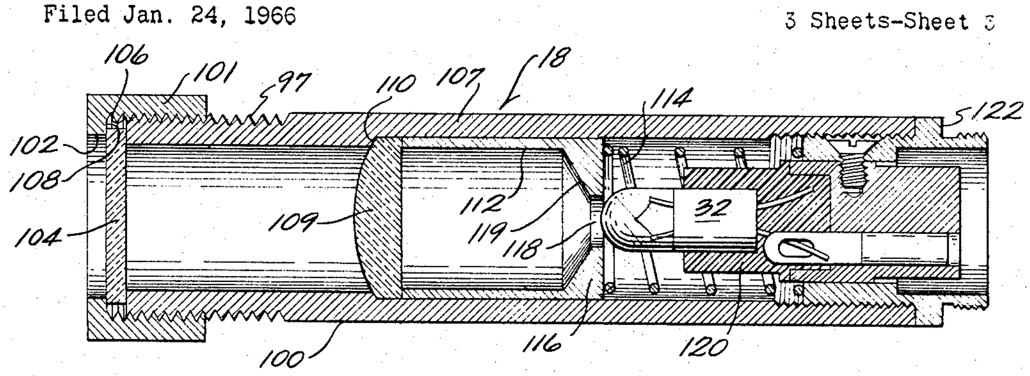
FIG. 4 is a sectional view of the emitter probe.
Figures 5, 6:
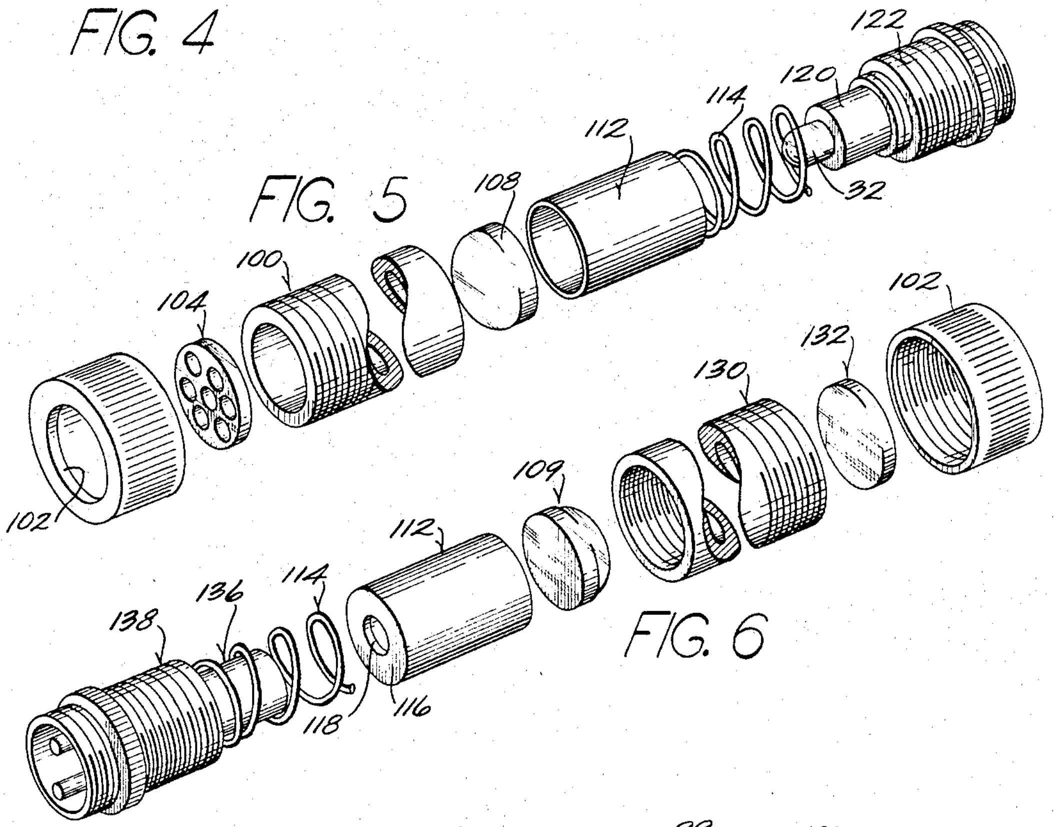
FIG. 5 is a partial exploded perspective view of the internal elements of the emitter probe.
FIG. 6 is a partial exploded perspective view of the internal elements of the detector probe.

The emitter probe 18, as can be best seen in FIGS. 4 and 5, includes a hollow cylindrical shell or tube 100 which has a cap 101 threadedly secured to one end thereof, using the threaded portion 97. The cap 101 has an aperture 102 which is covered by a filter 104 fixedly retained between the end 106 of the tube 100 and an annular flange 108 of the cap 101. The filter 104 functions to eliminate visible light and to seal the end of the tube 100 so as to prevent dust and the like from entering the tube. The tube 100 has an increased diameter section 107 and a collimeter 109 is held in position against the step 110 by a sleeve 112 and a spring 114 fitted within the tube. One end of the sleeve 112 has a lens 116 having a tapered cavity 119 therein which terminates in an aptreure 118. The tungsten filament lamp 32 is retained within a socket 120 which is, in turn, retained within an appropriate connector 122, for the connecting cable 22. The connector 122 is threadedly received within the tube 100 so that it may be easily removed to replace the lamp 32.

The lamp 32, as indicated, is a tungsten filament lamp, however, other types may be used such as, for example, gallium arsenide. The lens 116 and the collimeter 109 provide a beam of infrared energy which is approximately ⅜ inch in diameter, that is, the greatest majority of infrared energy is concentrated in a cylindrical beam ⅜ inch in diameter. With this arrangement, when the emitter probe 18 is aligned opposite the detector probe 20, the detector system 30 can easily detect the presence of objects up to approximately 5 feet away from the detector probe 20. When the total distance between the emitter and detector probes is less than one foot, wires as fine as 0.040 inch diameter can be detected. Also, when used in reflective applications, objects up to 2½ feet away from the detector probe 20 can be detected.

Figure 7:
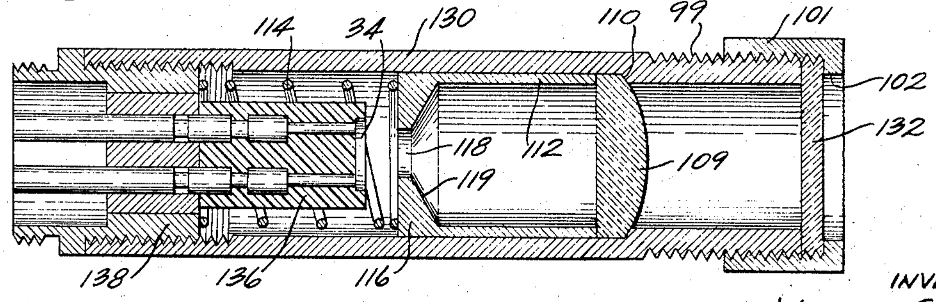
FIG. 7 is a sectional view of the detector probe.

The detector probe 20, as can be seen in FIGS. 6 and 7, is of the same construction as the emitter probe 18 except that the lead sulfide cell 34 and a filter 132 is substituted for the lamp 32 and the filter 104. Also, the lead sulfide cell 34 is retained within a socket 136 which is, in turn, retained within a connector 138, for the connecting cable 23. The basic probe construction can therefore be used as either the emitter probe or the detector probe, by making the appropriate substitution.

The connectors 122 and 138 for the two probes are preferably of the male and female types, respectively, and the connectors 94 secured to the cabinet 73 are of the opposite type, respectively, so that improper connections cannot be made between the units. It is apparent that the opposite combinations of connectors, or the same types of connectors can be used also, if desired.

The lead sulfide cell 34 may be a type T3 manufactured by Infrared Industries, Inc., of Waltham, Mass., or any type having similar characteristics and response curves, such as the Ektron detectors manufactured by Kodak. With appropriate changes to control response characteristics, lead selenide cells may also be used. Lead sulfide cells of the above type are responsive to infrared energy in the range from approximately 0.4 to 3.0 micron and have maximum detectivity at approximately 2.0 microns. A lead selenide cell has a slightly broader response range. It can therefore be seen that the lead sulfide cell 34 is responsive to light energy in the visible portion of the spectrum. Accordingly, to restrict the light energy to a usable range so that the cell 34 is not responsive to inplant lighting such as fluorescent lighting which is approximately 0.6 micron, or to sunlight, an optical filter 132 is provided to eliminate or prevent all light energy below 0.85 micron from impinging on the cell 34. A filter which is satisfactory for restricting the passage of light energy below this range is the #7–56 filter manufactured by Corning Glass Works of Corning, N.Y. Similar filters may be supplied by Infrared Industries, Inc. The filter manufactured by Corning is of a glass filter material and offers several advantages over similar filters of Infrared which are of plastic, although the latter is satisfactory for most applications. The Corning filter completely blocks visible light and is more easily cleaned since it is not as subject to scratching as the plastic filter nor is it as subject to deterioration from acids or solvents. In dusty environments or where the filter is liable to be splashed with acids or solvents, a glass filter is preferred. With the addition of the filter 132, the cell 34 is made spectrally sensitive only to light energy within the spectral band produced by the lamp 32.

Installation of the detector system 30 is relatively simple, and may be installed and adjusted without the requirements of a skilled technician. The emitter probe 18 and the detector probe 20 are mounted either in opposed positions or in reflective positions by using the mounting brackets 96 and 98 or by extending the probes through prealigned holes and securing them therein by means of lock nuts threadedly received on the threaded portions 97 and 99 thereon. To assist in aligning the probes, the cap 101 and the filter 104 are removed from the emitter probe 18 and the pushbutton switch 92 operated to cause the lamp 32 to glow incandescently. Sufficient illumination is provided in this fashion so that the probes can be easily visually aligned in opposed positions and also so that there is sufficient reflection from a polished or highly reflective surface to properly align them. The cap and filter are then replaced.

The sensitivity of the detector system 30 is next adjusted by rotating the sensitivity control or potentiometer 48 fully counter-clockwise. The beam of infrared energy should be unobstructed and all ambient conditions at the detector probe 20 should be the same as those anticipated during normal operation. In the case of reflective application, the reflective surface should be in position to reflect the infrared energy. The potentiometer 48 is next rotated clockwise until the relay 60 is operated. A lamp (not shown) may be advantageously connected across the relay terminals so that it will light when the relay is energized to give a visual indication of this fact. This is the lower threshold of infrared energy reception, and the position of the potentiometer shaft is noted for later adjustment.

The beam of infrared energy is then interrupted by placing a solid object between the probes 18 and 20, or by removing the reflecting surface or object. The relay 60 will be de-energized. The potentiometer 48 is again adjusted by rotating it clockwise until the relay 60 is again energized, or operated. When this occurs, this is the upper threshold of infrared energy reception. The position of the potentiometer shaft is again noted. The potentiometer shaft is next adjusted so that its position is set as close to the center postion between the upper and lower threshold points as possible. The sensitivity is now properly set for best operation. Operation too close to either of the threshold positions may cause erratic signal response. From the above description, it can be seen that installation and adjustment of the sensitivity is easily and quickly accomplished.

The detector system 30 can detect any object or material which blocks off or absorbs a sufficient quantity of the beam emitted by the emitter probe 18. It is sensitive to transparent plastics and glass, all metals, fabric, wood, paper, leather, most liquids, and other common industrial materials.

The detector system 30 can also distinguish between different types of materials and different surface textures at close distances. The only requirement is that one material or surface must absorb at least 25% more of the beam than the others with which it is being compared.

Sensitivity of the detector system 30 can be adjusted merely by turning the potentiometer or sensitivity control 48 with a standard screwdriver. This controllable sensitivity provides an infinite range of settings which can be used to eliminate interference from nearby sources of extraneous radiation, and to detect or differentiate between a broad spectrum of parts, materials and surface textures.

It is generally known that it is characteristic of lead sulfide cells to experience a 4% change of resistance per each degree centigrade change in temperature. In the past, this factor has resulted in considerable instability and severe design limitations. With the detector system of the present invention, if stability is plotted as a function of temperature variation it can be seen that the responsivity of the system is effected considerably when either the emitter probe 18 and the detector probe 20 are subjected to different temperature conditions. However, if both are kept under the same ambient condition, the stability of the system is extremely good. This is due to the particular manner in which the transistor 54 is included in the circuitry of the detector system. As the resistance bridge becomes unbalanced due to a change in temperature of the lead sulfide cell 34, the transistor 54 is inversely affected by the same temperature change in substantially a direct proportion to the change in the lead sulfide cell. The transistor 54 therefore compensates for the changes in the resistance of the lead sulfide cell due to temperature, and provides good stability.

In view of the fact that the detector system 30 can reliably sense the presence of any material up to five feet away and is not sensitive to ambient light levels make it ideal for a wide range of applications unsuitable to conventional mechanical, airjet, electromagnetic, or photocell type detectors. Typical applications include:

(1) Conveyor control—Monitors objects passing on conveyor line. Controls feeders, conveyors, auxiliary machines; activates counter; signals an attendant.
(2) Liquid level control—Determines when liquid reaches predetermined level, automatically shuts off pump.
(3) Stacking or packaging—Provides signal to counter. When desired number is reached, counter activates escapement, conveyor, or packaging operation.
(4) Burner control—Senses product or batch to be heated or exposed to flame, signals timer-operated valve in gas line. At end of timed cycle, valve closes to save gas.
(5) Cut-off control—Senses leading edge of workpiece, signals saw, knife or shear. Fast-acting relay assures uniform lengths.
(6) Overhead door safeguard—Attached at side or to bottom of door, stops door motor if obstruction breaks invisible beam.
(7) In-plant traffic control—Detects trucks or pedestrians approaching blind intersection, activates warning light or bell.
(8) Automatic door openers—Detects vehicles or pedestrians, provides instantaneous signal to door-opening mechanism.

Once the emitter probe 18 and the detector probe 20 have been aligned and the sensitivity of the system adjusted in the manner described above, the operation of the detector system 30 is as follows:

When an object to be detected obstructs the beam of infrared energy between the emitter probe 18 and the detector probe 20, the object either blocks off or absorbs a sufficient quality of the beam so that the detector probe 20 or, more particularly, the lead sulfide cell 34 detects the change in the infrared energy normally impinged on it. Its resistance changes correspondingly thereby unbalancing the balanced resistance bridge consisting of the resistors 49 and 50, the potentiometer 48 and the cell 34. The unbalanced condition of the resistance bridge renders the transistor 54 conductive. When transistor 54 is conductive, current flows through the load resistor 58 in its collector output circuit. The voltage drop across the load resistor 58 is coupled to the control electrode 64 of the silicon control rectifier 62 to "turn-on" the latter. When the silicon control rectifier is "on," current flows through the relay 60 thereby operating it. Relay 60 can, in turn, be used to control any one of a number of different devices, in the manner described above for the applications for the detector system. The only preventive maintenance normally required is to occasionally wipe the lens of each of the probes 18 and 20 to keep it relatively free of dust, dirt or film from atmospheric vapors.

Time consuming trouble shooting is completely eliminated by the "packaged" design of the circuitry described above. Should a malfunction occur, a simple electrical check of input and output terminals will reveal if it was caused by the failure of an internal component. If so, the entire chassis mounted circuit can be replaced in minutes. The cost of downtime and maintenance manpower is therefore virtually eliminated.

It is apparent that the detector circuitry can be modified in several respects. For example, the lead sulfide cell 34 can be positionally interchanged with one of the resistors 48–50 of the resistance bridge. In such a case, the operation is such that with no infrared energy falling on the cell 34, the relay 60 would be energized and with infrared energy falling on the cell the relay would be de-energized. Such an arrangement, however, is quite temperature sensitive and appropriate temperature stabilization must be provided. The resistor 66 and the capacitor 67 also can be eliminated and the silicon control rectifier 62 triggered directly by the output of transistor 54 with no apparent adverse effect on the operation of the detector. Still another modification is to use the voltage developed across the resistor 58 to directly operate an electronic counter or the like. Also, the silicon control rectifier 62 can be replaced by a power transistor, and the voltage across the secondary winding 40 of the transformer 36 can be rectified and filtered to provide a high voltage pulse for DC operation.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. An infrared detector system comprising in combination: an emitter probe including a source of infrared energy; a detector probe including means for detecting said infrared energy, said detector probe being positioned so that said infrared energy is impinged upon said detector means; and a control circuit coupled to a source of power and to said emitter probe and said detector probe operated in accordance with the infrared energy impinged on said detector means to provide an output control signal, said control circuit comprising a resistance bridge including as its four legs three resistors, at least one of which is a variable resistor having an output tap, and said detector means, a transistor adapted to compensate for changes in the resistance of said detector means due to temperature having a base electrode which is coupled to the junction between said detector means and one of said resistors, a collector electrode which is coupled through a load resistor to the junction between said detector means and the other one of said resistors and an emitter electrode which is coupled to said output tap of said variable resistor, said transistor being biased by and rendered conductive and non-conductive responsive to the balanced condition of said resistance bridge; output means for providing said output control signal; a transformer having a primary winding and a pair of secondary windings, said source of power being coupled to said primary winding, means coupled to one of said pair of secondary windings for providing a constant voltage to both said source of infrared energy and said resistance bridge, said output means being coupled to the other one of said pair of secondary windings; and means included in said coupling between said secondary winding and said output means normally operative to prevent current flow through said output means and rendered operative to permit current flow through the same to operate it to provide said output signal by said transistor.

2. An infrared detector system, as claimed in claim 1, further including switch means normally operative to couple said source of infrared energy with said source of constant voltage and operable to couple said source of infrared energy directly with said secondary winding whereby said source of infrared energy is caused to glow incandescently so that said emitter probe and said detector probe can be visually aligned.

References Cited

UNITED STATES PATENTS

| | | | |
|---|---|---|---|
| 2,193,606 | 8/1937 | Ulrey | 250—83.3 |
| 2,399,640 | 5/1946 | Kettering | 250—83.3 |
| 2,692,950 | 10/1954 | Wallace | 250—83.3 |
| 3,001,076 | 9/1961 | Crump | 250—435 |
| 3,091,704 | 5/1963 | Bashor et al. | 323—75 |
| 3,225,191 | 12/1965 | Calhoun | 250—83.3 |
| 3,245,509 | 4/1966 | Larson | 250—83.3 |
| 3,328,677 | 6/1967 | Naegele | 323—75 |

OTHER REFERENCES

Silicon Zener Diode and Rectifier Handbook, Motorola, 2nd ed., July 5, 1961, p. 108.

RALPH G. NILSON, *Primary Examiner.*

M. FROME, *Assistant Examiner.*